April 15, 1952
W. HELBERG
2,592,898
MAIL CARRIER
Filed Feb. 10, 1950
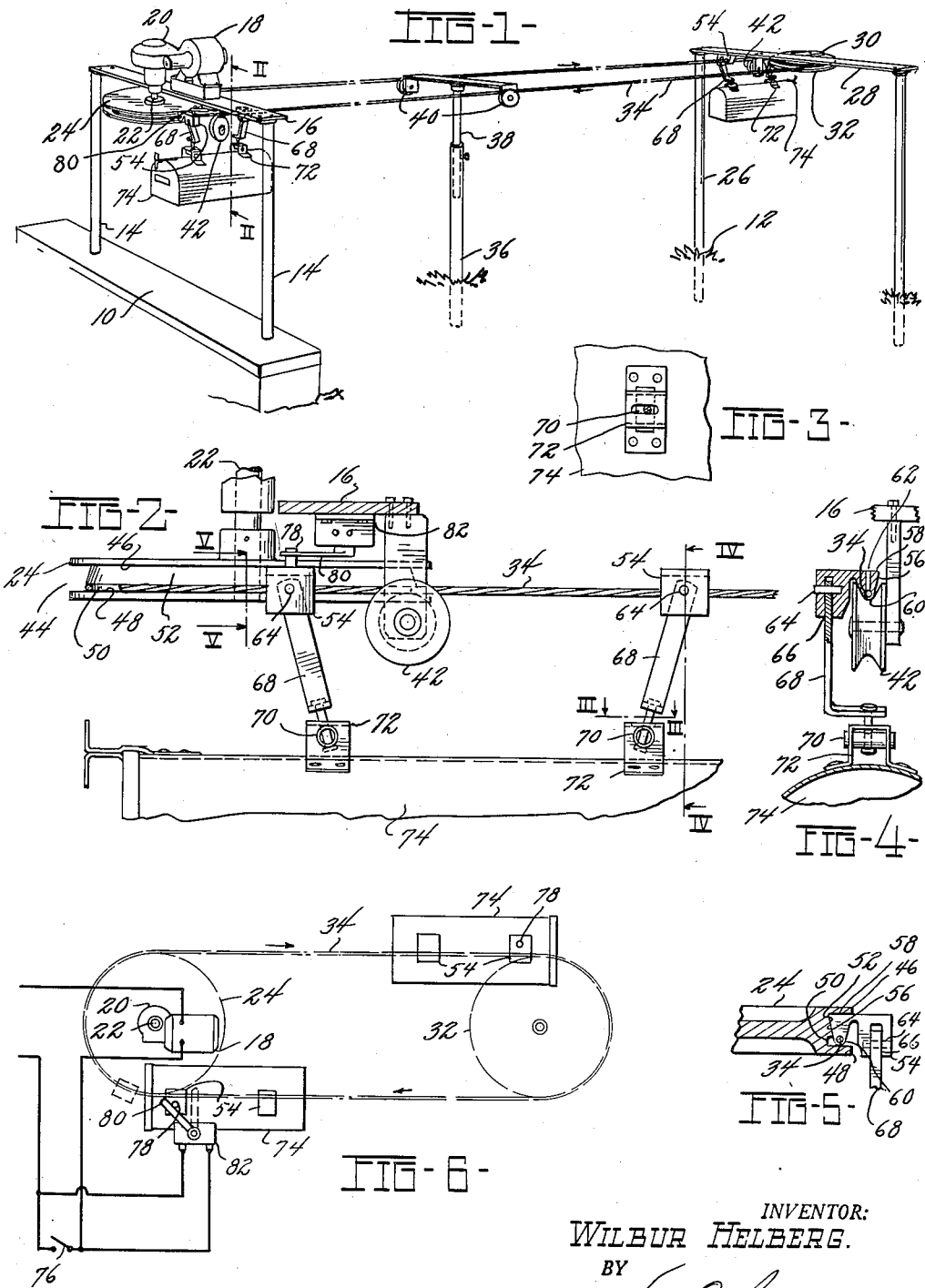
INVENTOR:
WILBUR HELBERG.
BY
ATTY.

Patented Apr. 15, 1952

2,592,898

UNITED STATES PATENT OFFICE 2,592,898

MAIL CARRIER

Wilbur Helberg, McClure, Ohio

Application February 10, 1950, Serial No. 143,484

5 Claims. (Cl. 104—178)

This invention relates to conveyors, particularly to the type for transporting mail to and from a rural address and the station therefor along a rural route.

An object of this invention is to provide an endless cable or belt line between a house and a remote position station, the line carrying a pair of containers, which, when they are at rest, are disposed, one at the house and one at the remote position, and operating mechanism therefor to reverse their respective stations.

Another object of this invention is to provide container mounts for an apparatus of this type, which will carry the containers throughout their travels in a substantially fixed horizontal position.

Another object of this invention is to provide container mounts imparting a stability to the containers throughout their travel cycles.

And another object of this invention is to provide mounting and driving mechanisms for the device cooperating with the container mounts to maintain container stability throughout their travel cycles.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a perspective view of an apparatus embodying the invention herein;

Fig. 2 is a view on the line II—II, Fig. 1;

Fig. 3 is a view on the line III—III, Fig. 2;

Fig. 4 is a view on the line IV—IV, Fig. 2;

Fig. 5 is a view on the line V—V, Fig. 2; and

Fig. 6 is a diagrammatic showing of the device including a control circuit therefor.

A typical installation of the mechanism herein is shown as adapted to transfer mail to and from a house station 10 and a remote roadside station 12.

The house station 10 is conveniently constructed from a pair of posts 14 supporting a bridge plate 16. The plate 16 mounts motor 18 and speed reducing transmission 20 from which shaft 22 has pulley 24 fixed thereto.

The roadside station 12 may be of a construction including posts 26 carrying bridge plate 28 therebetween which provides a bearing 30 to mount idler pulley 32.

An endless cable 34 is trained about the drive pulley 24 and the idler 32. If the distance between the stations 10, 12, warrants, one or more intermediate cable supporting structures 36 are provided which include adjustable standards 38 carrying properly spaced cable supporting sheaves 40.

The bridge plates 16, 28, each mount an additional pulley 42 as guides for the incoming cable onto the pulleys 24, 32.

These pulleys 24, 32 are of novel construction in that their grooves 44 are flanked by opposing flanges 46, 48, having the groove bottom therebetween include a first seat 50 for normally engaging the cable 34. This seat 50 is adjacent the flange 48, and a second seat 52 extends, conically as to the pulley axis, from the first seat 50 to the flange 46. A cross-sectional seat providing contour for the groove is thus provided.

The cable 34 carries two pair of blocks 54 oppositely positioned on the cable extent and each pair spaced from each other a distance less than one-half the circumference of either pulley 24 or 32. Each block 54 is provided with an inner face 56 and an upper face 58. These two faces are cross-sectionally contoured to nest with the pulley seat 52 and its adjacent flange 46, whenever they are in contact so that the block 58 is nested in the pulley to be rigidly held in a fixed predetermined position. Each block is also provided with a cable engaging portion 60 cross-sectionally contoured to ride about all the pulleys involved with the mechanism. Lock pin 62 may fix the block 54 at any desired position along the cable 34. The blocks also mount pins 64 as supports across grooves 66 for swingably suspending links 68.

The links 68 remotely mount pivotal extensions 70 in bearing brackets 72 on carriers 74. By this mount, the mail boxes 74 are suspended in direct vertical alignment below the cable 34, and retain their fixed horizontal position at all times, even when the blocks encircle the pulleys 24 or 32. In this turn about the pulleys, the blocks are closer together when making the turn, but the swing and pivot mounts keep the containers 74 in their fixed path.

When the mechanism is at rest, the containers are held in position due to the nesting of the blocks and pulleys. Therefore, weather conditions including high winds, do not disturb the boxes nor is any frictional wear developing. The box longitudinal position is also fixed so there is no spilling of contents, even should the box be open.

Mail is placed in a box at either station. An operator closes switch 76 at the house station and thereby completes a circuit to the motor 18 causing the cable to start traveling. One of each pair of blocks 54 carries a pin 78 which contacts arm 80 of a cut-out switch 82 in the motor operating circuit. This switch 82 is mounted on the underside of the bridge plate 16. The switch 76 needs to be held closed only long enough to permit the pin 78 to clear the arm 80, when the switch 82 automatically closes. The circuit to the motor will remain closed until the pin 78 on the opposite pair of blocks reaches the arm 80 to open the switch 82. At this point the respective positions of the boxes 74 will be reversed.

Mail can be delivered from the house to the road for pick-up or the mail delivered by the rural carrier can be transferred to the house without the necessity of personally carrying the mail over long distances or through bad weather.

The boxes automatically move themselves into fixed position at the pulley stations and as the blocks travel about the pulleys, the cable 34 is lifted just sufficiently from its seat 50 to add a desirable taughtness thereto.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. In an article transfer device of the class described, a pair of spaced pulleys mounted for rotation about substantially parallel vertical axes, an endless cable about said pulleys, means for driving one of said pulleys, a block attached to said cable, an article carrier mounted by said block, said block having a contact face directed toward and engaging the pulleys as the cable length mounting said block passes around said pulleys, and a groove in the rim of at least one of said pulleys of a cross-sectional contour to nest with the contact face of said block to maintain said block in a predetermined fixed horizontal position as long as said block engages said pulley.

2. In an endless conveyor of the class described, a pulley, a line about said pulley, said pulley having a groove about its rim including a seat to normally engage said line, a block attached to said line for movement therewith, said block having a pulley engaging face contoured to nest with said groove while in contact therewith while wedging the line outwardly from its seat to increase the line tension and thereby hold said block in fixed radial position to said pulley, and an article carrier suspended from said block.

3. In an endless cable conveyor of the class described, a pair of peripherally grooved pulleys for mounting said cable, means for driving one of said pulleys, a pair of blocks carried by said cable spaced a distance apart of less than one-half the length of the circumference of one of said pulleys, said blocks and a portion of the width of the grooves about said pulleys being cross-sectionally contoured to nest for holding said blocks to said pulleys when said blocks and pulleys are in contact, a link pivotally attached to each block and extending downwardly therefrom, and a carrier pivotally mounted by said links.

4. In a conveyor of the class described, a pulley, a cable trained about said pulley, said pulley having its rim provided with a pair of opposing flanges with a groove therebetween, the bottom of said groove including a first seat adjacent one flange in which said cable normally nests, and a second seat between said first seat and the other of said flanges including a face conically disposed as to the axis of said pulley, a block carried by said cable, said block having faces to nest against said conical face and one of said flanges when the block engages said pulley, and a carrier mounted on said block.

5. In a conveyor of the class described including a pulley, a cable trained about said pulley and a carrier block on said cable, said pulley having a pair of opposing peripheral flanges providing a groove therebetween, the groove adjacent one flange having a first seat adapted to engage said cable, said groove providing a conical face between the first seat and the other flange, and a complementary contact face on said block to nest against said conical face when said block is in contact with the pulley to thereby hold said block in a fixed position relatively thereto.

WILBUR HELBERG.

REFERENCES CITED

The following references are of record in the file of this patent:

UNITED STATES PATENTS

| Number | Name | Date |
| --- | --- | --- |
| 710,457 | Hoover | Oct. 7, 1902 |
| 1,028,894 | Maar | June 11, 1912 |
| 1,236,459 | McDougall et al. | Aug. 14, 1917 |